Feb. 8, 1949.　　　　W. L. APPLING　　　　2,461,405
PHOTOGRAPHIC FILM AND SCREEN HOLDER
Filed Dec. 8, 1945　　　　　　　　　　　　　　4 Sheets-Sheet 1
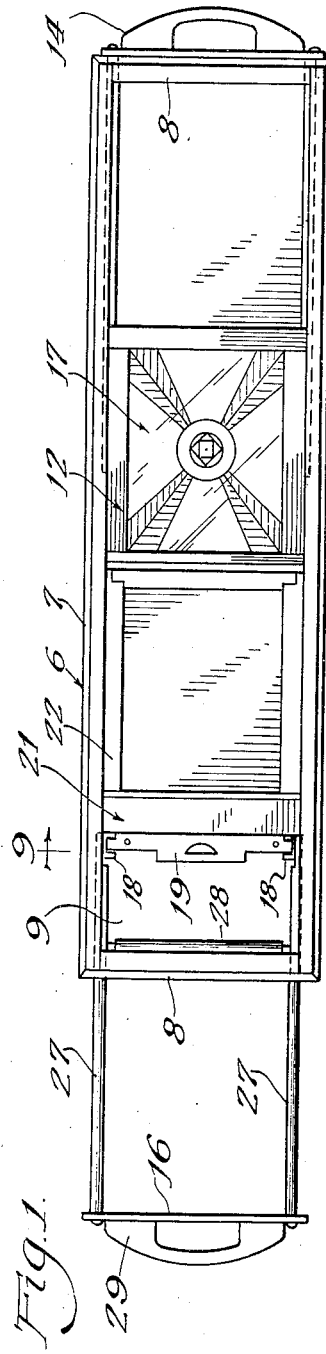
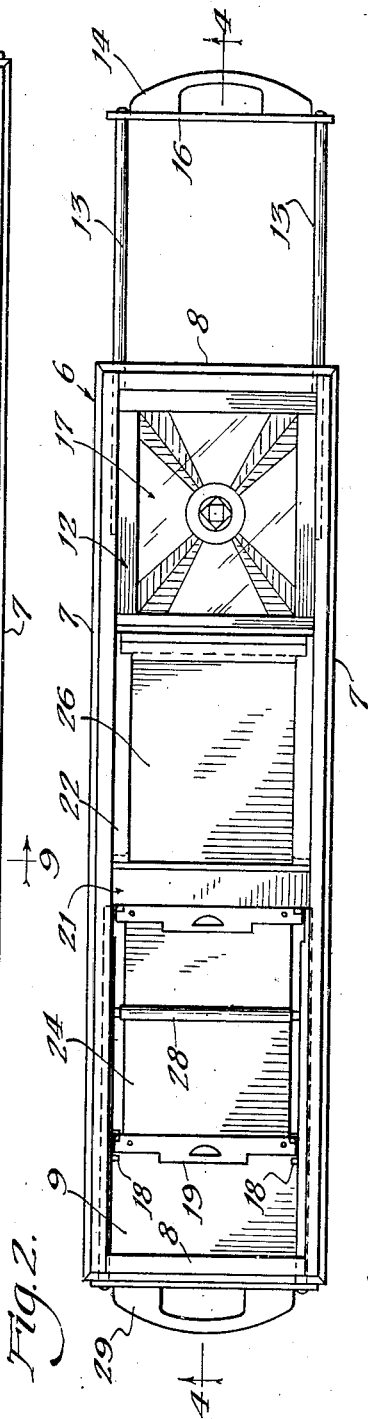
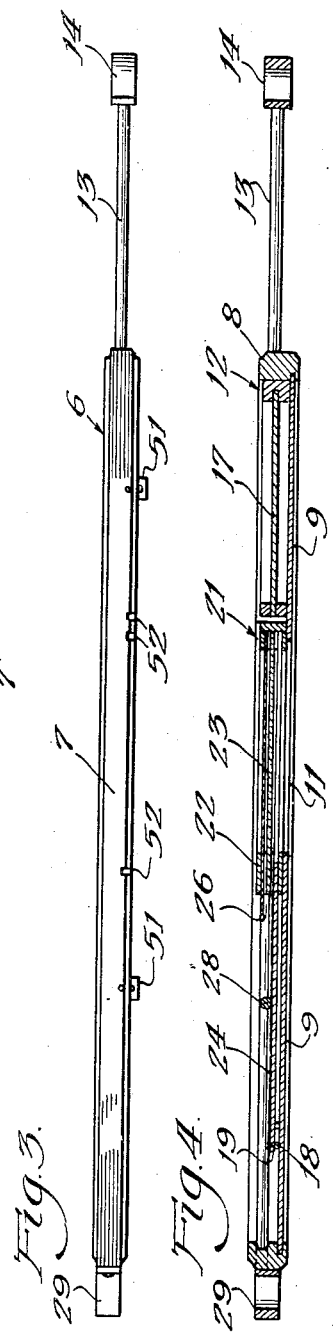
Inventor:
William L. Appling
By: Lee J. Gary
Attorney.

Feb. 8, 1949. W. L. APPLING 2,461,405
PHOTOGRAPHIC FILM AND SCREEN HOLDER
Filed Dec. 8, 1945 4 Sheets-Sheet 2
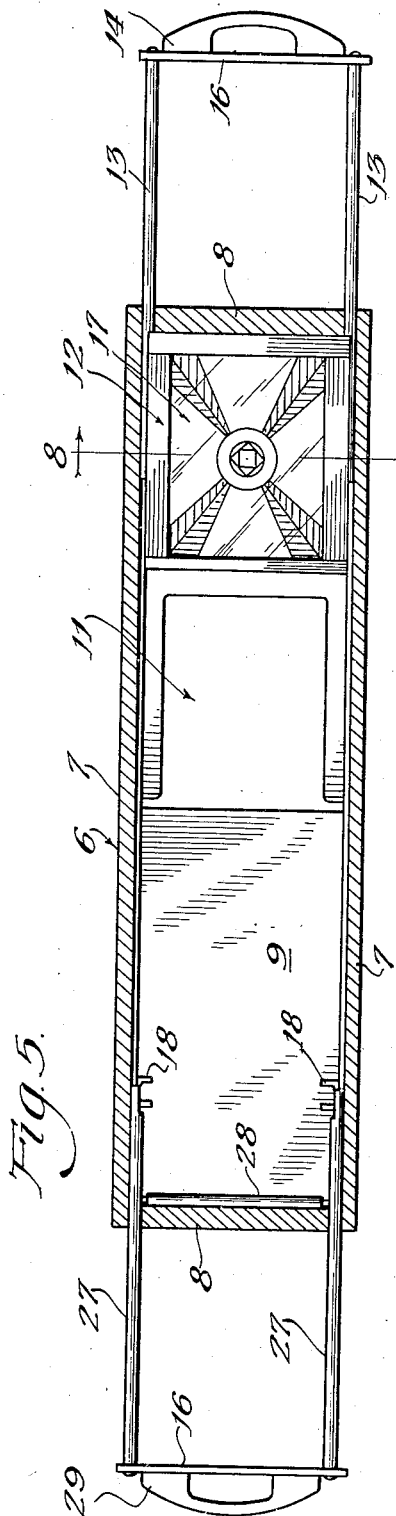
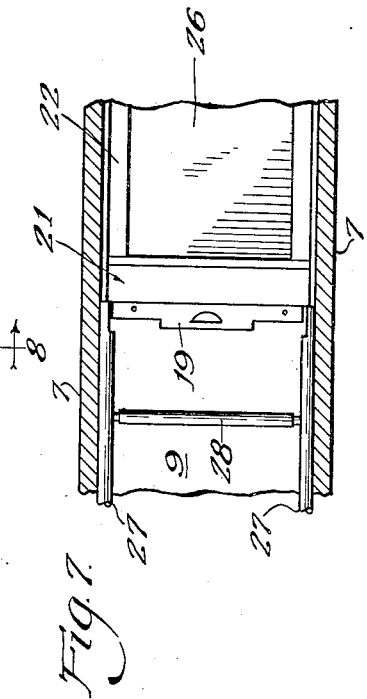
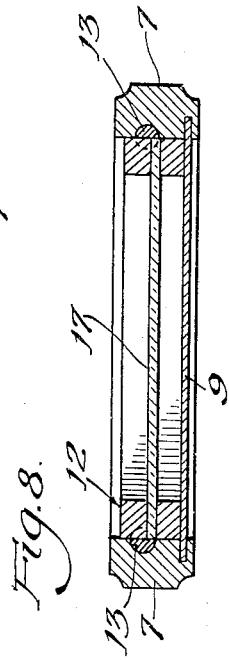
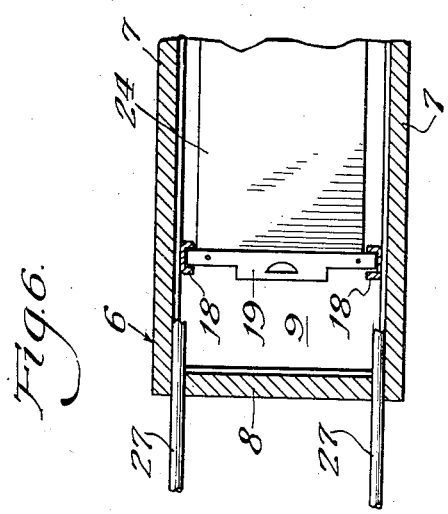
Inventor:
William L. Appling
By: Lee J. Gary
Attorney.

Feb. 8, 1949. W. L. APPLING 2,461,405
PHOTOGRAPHIC FILM AND SCREEN HOLDER
Filed Dec. 8, 1945 4 Sheets-Sheet 3

Inventor:
William L. Appling
By Lee J. Gary
Attorney

Feb. 8, 1949. W. L. APPLING 2,461,405
PHOTOGRAPHIC FILM AND SCREEN HOLDER
Filed Dec. 8, 1945 4 Sheets-Sheet 4
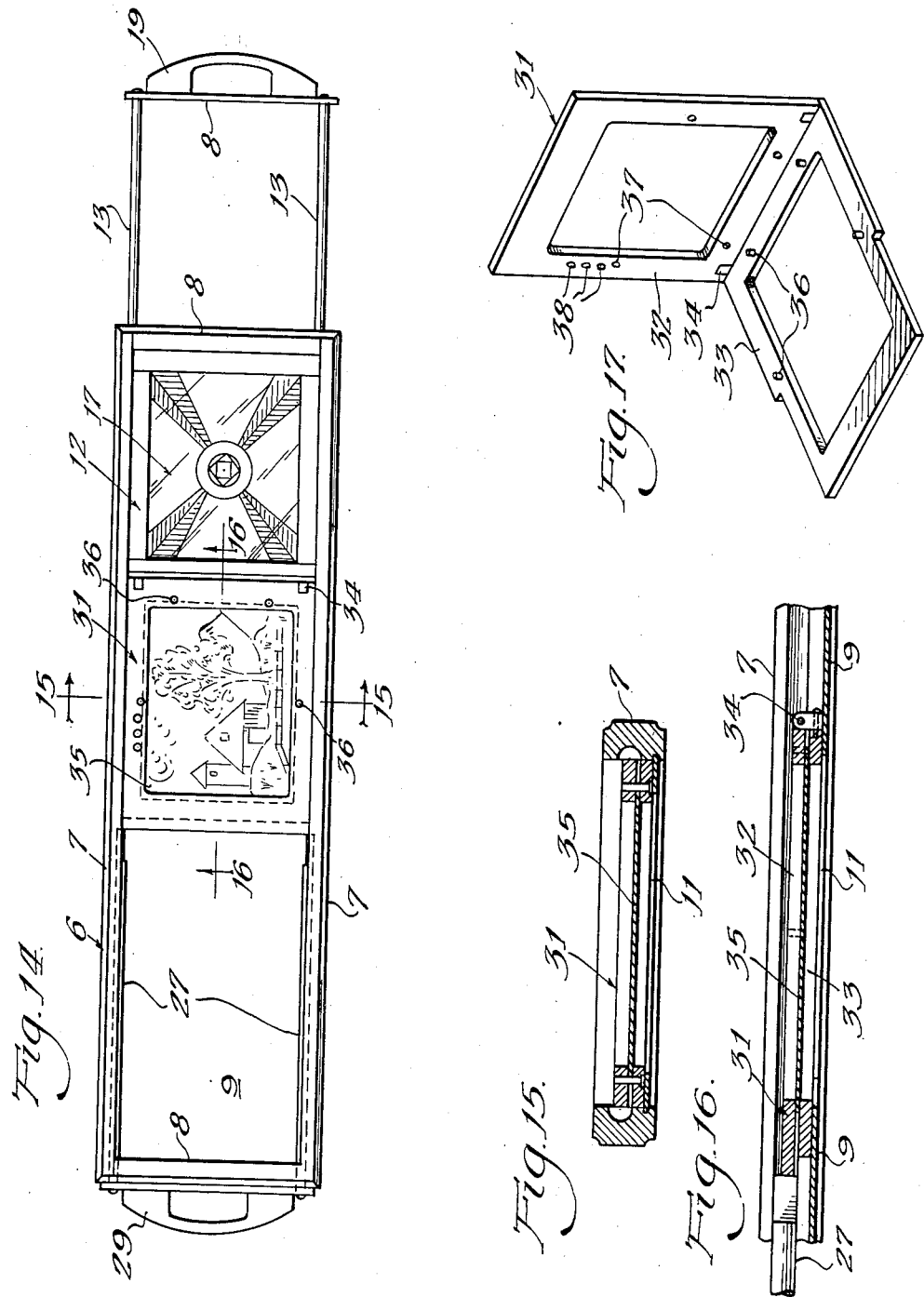
Inventor:
William L. Appling
By: Lee J. Gary
Attorney.

Patented Feb. 8, 1949

2,461,405

UNITED STATES PATENT OFFICE 2,461,405

PHOTOGRAPHIC FILM AND SCREEN HOLDER

William L. Appling, Uvalde, Tex.

Application December 8, 1945, Serial No. 633,813

4 Claims. (Cl. 88—24)

This invention relates to improvements in photographic devices, and is more particularly concerned with the provision of a device embodying a focusing screen holder and a film holder which are mounted for alternate movement into and out of registry with a sight opening provided intermediate the ends of a frame.

More particularly, this invention contemplates the provision of a device of this kind adapted for use with enlargers, projectors, copying cameras, photographing cameras, and the like for projecting a design from a focusing screen upon a suitable projection surface when the focusing screen holder is in registry with the sight opening in the frame, and then moving the film holder into registry with the sight opening to obtain a photographic reproduction having the same sharpness of focusing as that of the design projected from the focusing screen.

This invention further contemplates the provision of a photographic device of this type which may readily be demountably positioned for use on standard types of photographic equipment.

This invention further contemplates the provision of a photographic device having a focusing screen holder and a film ho'der disposed for alternate reciprocable movement from opposite ends of a frame into registry with a sight opening formed in the bottom of a supporting frame, together with improved means disposed at opposite ends of the frame for manually reciprocating said holders whereby same are alternately positioned in registry with said sight opening.

This invention further contemplates the provision of a photographic device including a frame having a sight opening and a reciprocable light-tight film holder provided with a slidable shutter, and means for securing the shutter against movement relative to the frame during reciprocable movement of the fi'm holder whereby the film contained in the film holder will be alternately uncovered and then covered by movement of the film holder into and out of registry with the sight opening provided in the frame.

This invention further contemplates the provision of a pair of interchangeable film holders, one holder being provided to receive a sensitized film, and the other holder being adapted to receive a negative film for use as a focusing screen. The negative film ho'der is preferably formed with a plurality of apertures adapted to be filled with filter material of different colors through which light is projected onto a suitable projection surface during the reproduction of color photographs.

This invention embodies other novel features, details of construction and arrangement of parts which are hereinafter set forth in the specification and claims and illustrated in the accompanying drawings wherein:

Fig. 1 is a plan view showing a photographic device embodying features of this invention with a focusing screen holder disposed above the sight opening in the frame and a film holder in retracted position.

Fig. 2 is a plan view similar to Fig. 1 in which a film holder is moved into position over the sight opening with the film contained therein ready for exposure to the light.

Fig. 3 is a side elevational view of the device.

Fig. 4 is a longitudinal sectional view taken along the line 4—4 of Fig. 2.

Fig. 5 is a view partly in section and partly in elevation showing the photographic device with the film holder removed therefrom and the focusing screen ho'der in its retracted position.

Fig. 6 is a fragmentary view similar to Fig. 5 showing the stirrup means employed for engagement with the lower shutter of a film holder.

Fig. 7 is a fragmentary view similar to Fig. 5 illustrating the manner in which push rods engage the back edge of a film holder to move same into position over the sight opening provided in the frame.

Fig. 8 is a transverse sectional view taken along the line 8—8 of Fig. 5.

Fig. 14 is a plan view similar to Fig. 2 in which a negative film holder is shown in position in the frame for registry with the sight opening.

Fig. 15 is a transverse sectional view taken along the line 15—15 of Fig. 14.

Fig. 16 is a fragmentary longitudinal sectional view taken along the line 16—16 of Fig. 14.

Fig. 17 is a detail perspective view showing an improved form of negative holder for use with my device.

Figure 9:
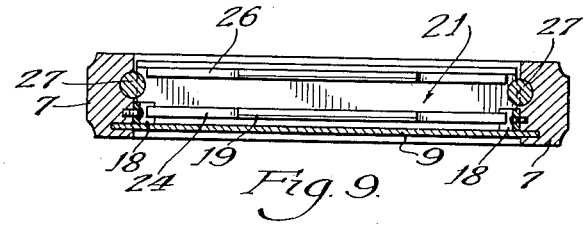
Fig. 9 is a transverse sectional view taken along the line 9—9 of Fig. 1.

Referring now to the drawings for a better understanding of this invention, the photographic device is shown as comprising a frame 6 provided with side walls 7, end walls 8 and a bottom 9. A sight opening 11 is provided in the bottom of the frame and intermediate the ends thereof.

A focusing screen holder 12 is mounted within the frame 6 for reciprocable movement between the sight opening 11 and one end of the frame by means of a pair of push rods 13 having their inner ends secured to the focusing screen frame 12 by means of screws (not shown) and their outer ends connected by a suitable handle 14 having an inner face 16 for abutting engagement with the end wall 8 when the focusing screen is in registry with the sight opening 11. The focusing screen holder is constructed in the form of a frame to receive a focusing screen 17 which may comprise a negative film or a piece of frosted film bearing a geometric design adapted to be projected downwardly upon a suitable projection surface.

A pair of stirrups 18 are secured to opposite side walls 7 of the frame 6 for engagement with the ends of a shutter handle 19 forming part of a film holder 21. The film holder 21 is of standard construction comprising a frame 22 having a central partition 23 and a pair of shutters 24 and 26 mounted for sliding movement into and out of the frame 22. As is well known in this art, an unexposed plate or film may be mounted on either or both sides of the partition 23 and protected from light by means of the shutters 24 and 26. In taking a picture, one of the shutters 24 or 26 is withdrawn from its position in the frame 22 to expose the film to light.

In the use of the present device, a film holder 21 is inserted in the frame 6 in the manner illustrated in Fig. 1 with the ends of the handle 19 of the lower shutter 24 engaged in the stirrups 18. While the lower shutter 24 is thus engaged, the film holder 21 is adapted to be moved into registry with the sight opening 11 by means of a pair of push rods 27 having their inner ends connected by a handle 29 which is similar in construction to the handle 14. During forward movement of the film holder 21, it will be noted that the lower shutter 24 is held against movement by the stirrups 18 to leave a film or plate exposed above the sight opening 11, as illustrated in Fig. 4. After exposure of the film, the focusing screen holder 12 is moved into position with the sight opening 11 to close the shutter 24. After the shutter 24 is closed, the film holder 21 is removed from the frame 6 by merely lifting the holder out of the stirrups 18.

This invention further contemplates the provision of a negative film holder 31, illustrated in Figs. 14 to 17 in the drawings. The negative film holder 31 comprises a pair of frame members 32 and 33 which are hinged together at 34 to receive a negative film therebetween. The frame 33 is provided with a plurality of alignment pins 36 for engagement with the edges of a negative film, and apertures 37 are formed in the upper frame member 32 to receive said pins. The upper frame member 32 is also provided with a plurality of apertures 38 to receive light filter material of different colors.

The negative film holder 31 is adapted to be mounted in the frame in the manner illustrated in Figs. 14 and 16 for movement into registry with the sight opening 11 by means of the push rods 27 and handle 29. The negative film holder is useful in projecting pictures embodied on the negative film onto a projection surface for the purpose of making enlargements or reproductions. The provision of filter material of different colors within the apertures 38 of the upper frame 32 facilitates the reproduction of pictures in color. It will be noted that light rays passing through the negative film will also pass through the color filter material within the apertures 38 and be projected downwardly upon a suitable projection surface, and thus prevent mistakes in the selection of color filters during reproduction of pictures in color.

Figure 10:
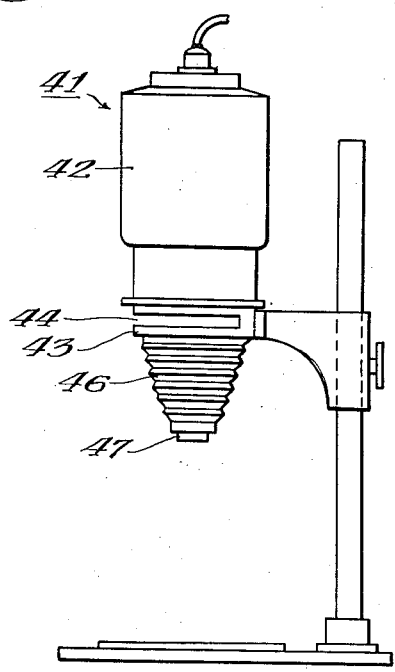
Fig. 10 is a side elevational view showing an enlarger of the type adapted to receive a photographic device.
Figure 13:
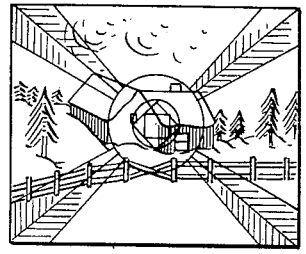
Fig. 13 illustrates a projection of the geometric design embodied in the focusing screen onto an object to be copied or photographed.
Figure 11:
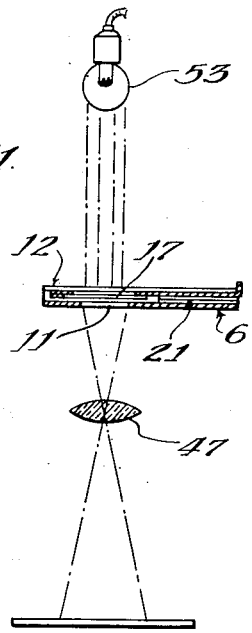
Fig. 11 is a schematic illustration showing the use of a photographic device in projection focusing.
Figure 12:
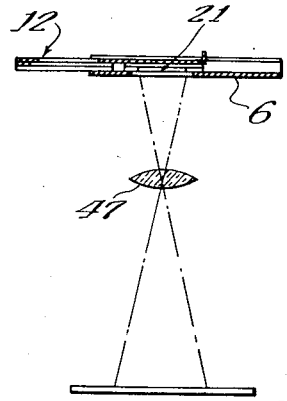
Fig. 12 is a schematic view showing a focusing screen in retracted position and the film holder in registry with the sight opening.

Fig. 10 illustrates a standard type of enlarger 41 adapted for use with a photographic device of the type shown and described. The enlarger is shown as comprising a lamp housing 42, a frame portion 43 having a recess 44, a bellows 46, and a lens 47. As illustrated, the enlarger may be of the type in which the lamp housing 42 may be removed and the remaining portion thereof employed as a camera. The frame 6 is provided with gravity locks 51 and slots 52 in the side walls thereof for interlocking engagement with apertures or lugs (not shown) of the type ordinarily provided on enlargers when the frame 6 is mounted within the slot 44.

In projection focusing, by means of an enlarger of the type shown in Fig. 10, the focusing screen holder 12 is first moved into registry with the sight opening 11 and the projector lamp is turned on to project the design of the focusing screen downwardly upon the object to be photographed or copied. If the object is in proper focus, the lamp 53 is turned off and the film holder 21 is moved into registry with the sight opening 11, as illustrated in Figs. 2 and 4 to expose the film. After exposure of the film, the focusing screen holder 12 is pushed inwardly by means of a handle 14 to return the film holder 21 to its position shown in Fig. 1. It will be noted that during movement of the film holder 21 into and out of registry with the sight opening 11 that the stirrups 18 engage the ends of the handle 19 of the lower slide 24 to open and close the film holder during its movement into and out of registry with the sight opening 11.

While this invention has been shown in but one form, it is obvious to those skilled in the art that it is not so limited but is susceptible of various changes and modifications without departing from the spirit and scope of the claimed invention.

I claim as my invention:

1. A photographic device which comprises a rectangular frame, a bottom upon said frame provided with a sight opening intermediate its ends, a focusing screen holder reciprocally movable into and out of registry with said sight opening, a focusing screen mounted in said holder, a film holder mounted for reciprocal movement independent of movement of said focusing screen holder into and out of registry with said sight opening, separate means mounted at the opposite ends of said frame for respectively moving the focusing screen holder and the film holder in said frame.

2. A photographic device which comprises a rectangular frame, a bottom upon said frame provided with a sight opening intermediate its ends, a focusing screen holder reciprocally movable into and out of registry with said sight opening, a focusing screen mounted in said holder, a film holder mounted for reciprocal movement independent of movement of said focusing screen holder into and out of registry with said sight opening, separate means mounted at the opposite ends of said frame for respectively moving the focusing screen holder and the film holder in said frame, said separate means comprising two pair of rods slidably mounted upon said frame.

3. A photographic device which comprises a rectangular frame, a bottom upon said frame provided with a sight opening intermediate its ends, a focusing screen holder reciprocally movable into and out of registry with said sight opening, a focusing screen mounted in said holder, a film holder mounted for reciprocal movement independent of movement of said focusing screen holder into and out of registry with said sight opening, separate means mounted at the opposite ends of said frame for respectively moving the focusing screen holder and the film holder in said frame, said separate means comprising two pair of rods slidably mounted upon said frame, and abutment means carried upon each pair of rods exteriorly of said frame for abutting said frame when the respective holders are disposed in alignment with said sight opening.

4. A photographic device which comprises a rectangular frame having a bottom provided with a sight opening intermediate its ends, side walls upon said frame, a film holder adapted to carry an unexposed film positioned upon said bottom and guided for slidable movement upon said bottom by said side walls, a shutter slide carried by said film holder, projecting ends upon said slide, stirrups carried by the side walls of said frame for engaging the ends of said slide, means for moving said film holder into and out of registry with said sight opening while said shutter slide remains anchored upon said stirrups, a focusing screen holder slidably mounted upon said frame, a focusing screen carried by said screen holder, and separate means for moving said screen holder into and out of registry with said sight opening.

WILLIAM L. APPLING.

REFERENCES CITED

The following references are of record in the file of this patent:

UNITED STATES PATENTS

| Number | Name | Date |
|---|---|---|
| 520,290 | Barker | May 22, 1894 |
| 2,172,283 | Kirby et al. | Sept. 5, 1939 |
| 2,307,981 | Babcock | Jan. 12, 1943 |
| 2,388,240 | Appling | Nov. 6, 1945 |

FOREIGN PATENTS

| Number | Country | Date |
|---|---|---|
| 420,635 | Great Britain | Dec. 5, 1934 |